March 8, 1938.  R. S. HOPKINS  2,110,484

DEVICE FOR PROJECTING ENLARGED IMAGES

Filed March 7, 1936  2 Sheets-Sheet 1

INVENTOR:
Roy S. Hopkins,
BY
ATTORNEYS.

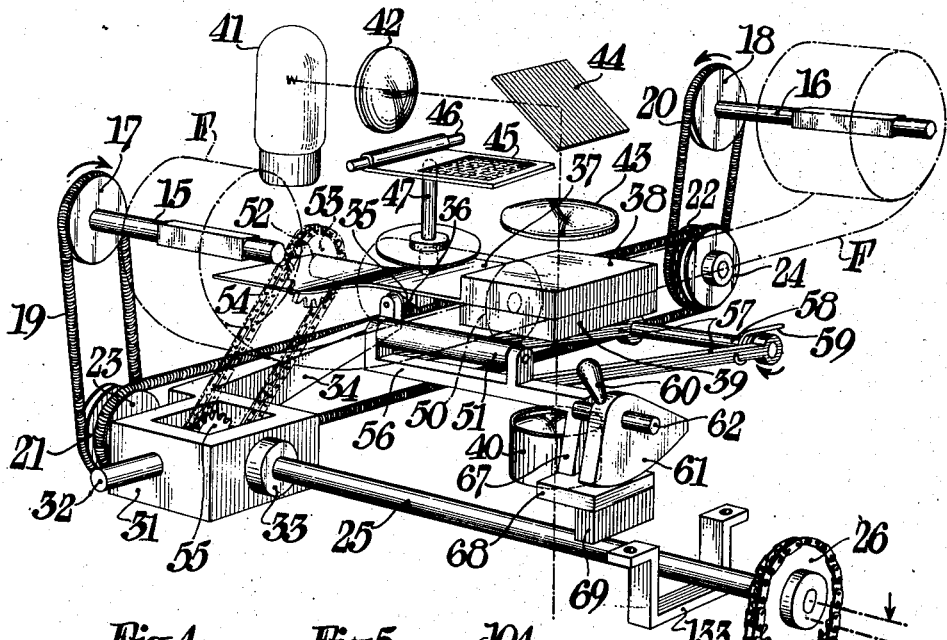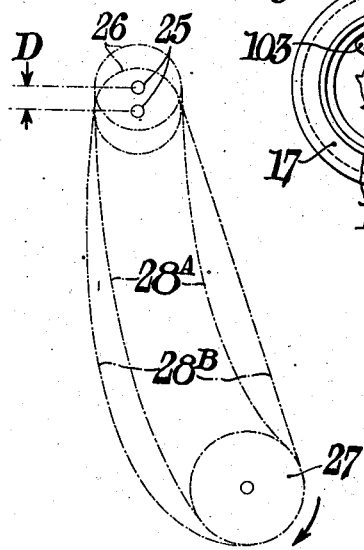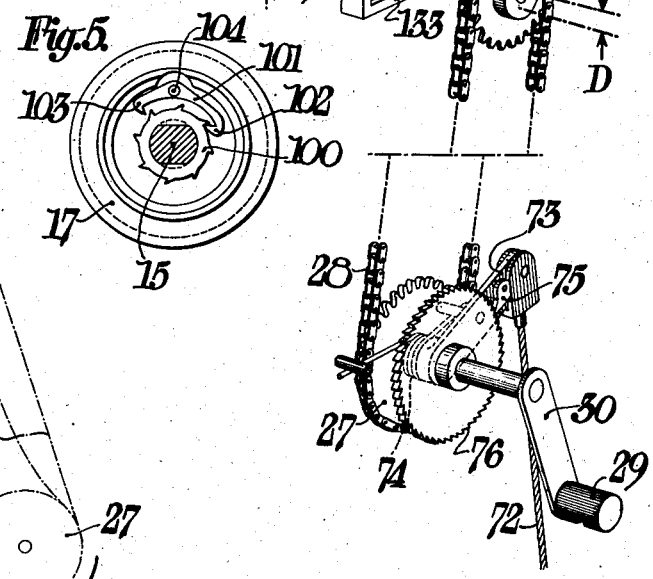

Patented Mar. 8, 1938

2,110,484

UNITED STATES PATENT OFFICE 2,110,484

DEVICE FOR PROJECTING ENLARGED IMAGES

Roy S. Hopkins, Rochester, N. Y., assignor, by mesne assignments, to Eastman Kodak Company, Jersey City, N. J., a corporation of New Jersey Application March 7, 1936, Serial No. 67,689

9 Claims. (Cl. 88—24)

This invention relates to a device for producing enlarged images from various parts of a film and is primarily intended for reading legends printed on such film. One object of my invention is to provide a device which will hold a film accurately in the focal plane of an objective, the objective being so positioned with respect to an easel that a sharp image will be formed at an enlarged magnification thereon. Another object of my invention is to provide a device in which the film may be moved rapidly back and forth for examining various parts of the film by means of the projected image on the easel. Still another object of my invention is to provide a projector with a film winding and rewinding mechanism, so arranged that the operation of starting to wind film releases the tension on the film flattening device and stopping the winding operation automatically again flattens the film. Still another object of my invention is to provide a power drive which can be rapidly changed in direction by a simple type of clutch mechanism, and other objects will appear from the following specification, the novel features being particularly pointed out in the claims at the end thereof.

The present machine is an improvement over the machine shown in my Patent 2,008,982, granted July 23, 1935, for a Device for producing enlarged images.

Coming now to the drawings wherein like reference characters denote like parts throughout:

Fig. 3 is a perspective schematic showing of the film moving mechanism used with the projector shown in Fig. 1.

Fig. 4 is a schematic showing of the drive for moving the film back and forth, and Fig. 5 is a detail view of a clutch which may be used in connection with the machine shown in Fig. 3.

Figure 1:
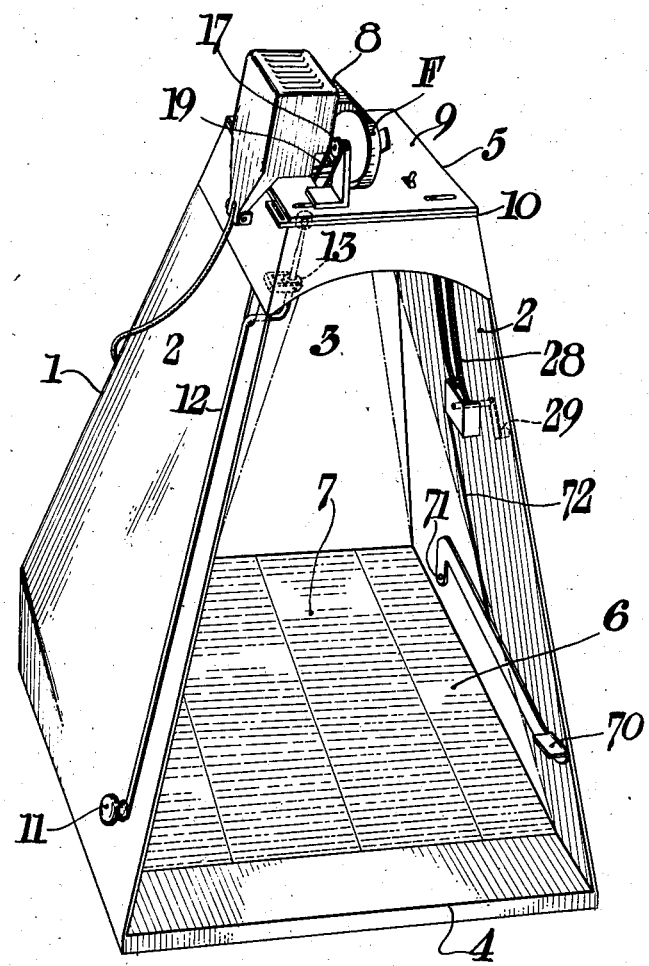
Fig. 1 is a perspective view of a device for projecting enlarged images constructed in accordance with and embodying a preferred form of my invention.

It is one of the purposes of my invention to provide a machine for reading legends produced on a small size on a film. Such records may be photographic reproductions of checks, newspapers, or other documents, and the film record may be of any standard size, such as 16 mm. or 35 mm. in width.

My invention comprises broadly providing a casing designated broadly as 1 having side walls 2 and a rear wall 3 tapering from a wedge-shaped base 4 towards a top member 5. The base member 4 preferably slants from the front to the back and is provided with a surface 6 suitable to reflect an image, such as a white or silver surface. The front of the cabinet 1 is left open so that the image diagrammatically indicated at 7 can be viewed through this opening.

The projector mechanism designated broadly 10 at 8 projects an image from a record, such as a film F, downwardly onto the easel 6 in a manner which will be hereinafter more fully described.

The top 5 includes a slidable plate 9 carrying the projector mechanism 8, this plate, together with a second plate 10, being slidable in two directions so that various parts of the image on the film F can be projected on the screen or easel 6. The position of the film is controlled by a handle 11 on a rod 12 mounted at 13 to move longitudinally or transversely of the casing. The structure for moving the projecting mechanism may be the same as that shown in my patent above referred to, and for a complete description of this mechanism reference may be had to my patent.

Referring to Fig. 3, the film F may be mounted on reels or hubs on the shafts 15 and 16. These shafts are rotatably mounted and may be driven by the pulleys 17 and 18 which are connected by belts 19 and 20 to pulleys 21 and 22 coaxially arranged with pulleys 23 and 24 so that these may be driven when a shaft 25 is turned by the sprocket wheel 26. Sprocket wheel 26 is connected to a sprocket wheel 27 by means of a chain 28 which is normally slack, as indicated at 28a in Fig. 4. Thus, when the handle 29 on crank 30 is turned to move the sprocket wheel 27 in the direction shown by the arrow in Fig. 4, the first part of this movement tends to take up the slack in the chain 28a, moving it from its position shown at 28a to the position shown at 28b.

Thus, the first part of the movement of sprocket 27 does not turn the sprocket 26, but tends to move the chain to a taut position, and from this taut position, it moves the sprocket 26 downwardly a distance D, as indicated in Fig. 4. This movement is permitted because the shaft 25 is mounted in a hinged bearing 31 which is in the form of a hollow box having trunnions 32 (only one being shown) extending to each side of it, these trunnions being mounted to turn in suitable bearings. Since the shaft 25 is supported in bearing members 33 in each side of the box, the shaft may tilt when this box swings upon the trunnions 32. The amount of movement of shaft 25 is limited by a bracket 133.

When the shaft 25 moves, the box 31 swings upon the trunnions 32 and moves an arm 34 carrying on its end a roller 35 in a reverse direction to the movement of shaft 25, that is, as shaft 25 is lowered, roller 35 is raised. This roller contacts with a cam 36 on the roller side of a spring plate 37 carrying a glass plate 38. This plate, with a similar plate 39, which is fixedly mounted, serves to hold the film F flat between the two plates. However, when the handle 29 is turned, and when the shaft 25 is lowered, the roller 35, through contact with cam 36, spaces plate 38 from plate 39 so that film can be freely wound back and forth above the objective 40 which projects an image carried by the film on the screen 6.

The projector may be of a standard type having a lamp 41 and condenser lenses 42 and 43, there being a mirror 44 to bend the light rays through the glass plates 38 and 39.

There is also a heat screen 45 mounted to turn on the hinge pintle 46 when a plunger 47 is thrust upwardly through its contact with the spring plate 37. Thus each time the plates 38 and 39 are separated for winding the film, the heat screen is moved to and from the path of the light. The reason for the light screen 45 moving into the path of the light beam when the glass plates 38 and 39 are separated for the movement of film is, that during the time the film is being moved, it is not in intimate contact with the glass plates which are, therefore, unable to dissipate the heat. However, as soon as the glass plates clamp down upon the film and are in intimate contact with it, the heat screen is not necessary because the glass plates conduct the heat from the film.

The film may be moved solely through the rotation of shafts 15 and 16 by means of the belts and pulleys above described, or the shafts 15 and 16 may be frictionally driven and the actual movement of the film may occur through the action of the ringer rolls 50 and 51 in the following manner: Roller 50 is preferably a rubber roller mounted on a shaft 52 carrying a sprocket 53 which may be driven by a chain 54 from a sprocket wheel 55 pinned to shaft 25. Thus, movement of shaft 25 in either direction will turn the roller 50 in either direction. The roller 51 is carried by a bearing bracket 56 supported by the arms 57 carried by a shaft 58, this shaft being turned by a spring 59 in the direction shown by the arrow to keep an even tension on the roller 51 for pressing it toward the roller 50. These two rollers are normally in contact for driving the film by turning the crank 29, but the lever 60 may swing the cam 61 upon its trunnion 62 to press down the bracket 56 through portions 67 and 68 thereof, and at the same time to press down upon the block 69 which will contact with shaft 25 to lower this shaft. The reason for this movement is that it is sometimes desirable to wind the film back and forth rapidly between the shafts 15 and 16 without utilizing the ringer rolls 50 and 51 which will be thus separated to such an extent that they cannot contact with and drive the film.

In place of the handle 29 being used to wind the film back and forth, I provide a lever 70 pivoted at 71 to the housing and carrying a cable 72 which is attached to the hinged arm 73 normally turned to the position shown in Fig. 3 by a spring 74. Arm 73 carries a pawl 75 adapted to engage the ratchet 76 so that the film can be moved by moving lever 70 downwardly. A series of downward thrusts moves the film in a series of movements sufficient to adjust contacting areas of reading matter successively across the easel 6. However, when it is desired to move any quantity of film, it is generally more convenient to use the handle 29.

If the film is to be moved solely by the ringer rolls 50 and 51, it is preferable to equip each of the pulleys 17 and 18 with a one-way driving clutch, as shown in Fig. 5, the driving clutch for pulley 18 being arranged to drive only when the belt 20 turns the pulley in the direction shown by the arrow, and the clutch for pulley 17 being arranged in a reverse direction. Thus, the clutches for pulleys 17 and 19 work in an opposite direction with respect to each other. These clutches may be of any standard construction, or, as shown in Fig. 5, the clutch for pulley 17 may consist of a ratchet wheel 100 carrying the shaft 15, this ratchet wheel being adapted to be engaged by an escapement 101. When the ratchet is engaged by the hook member 102, the pulley 17 may be keyed to the shaft 15 and will move with it. When, however, the shaft 15 moves in a reverse direction, the slanting edges of the teeth will engage part 103 of the escapement and permit the shaft 15 to turn without transmitting motion to the pulley. The escapement 101 is pivoted to the pulley by the stud 104. Thus, when the handle 29 is turned to wind the film on shaft 16, pulley 17 may idle on shaft 15. When the film is wound in an opposite direction, the clutch member will disconnect pulley 18 from shaft 16 so that the film will wind freely upon the shaft 15, which is at this time being turned through pulley 17.

Figure 2:
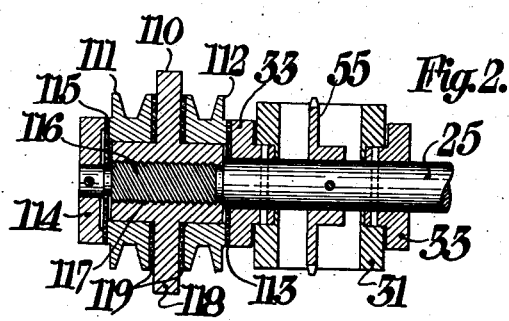
Fig. 2 is a fragmentary detail section through an improved form of clutch used with the mechanism shown in the other views of the drawings.

I have also found that the clutch shown in Fig. 2 is particularly desirable for this type of apparatus, since with it the clutches indicated in Fig. 5 as being useful for pulleys 17 and 18 may be omitted, if desired. In this form of my invention the box 31 supports the shaft 25, as before, in bearings 33, but there is a clutch member indicated broadly at 110 by which either the pulley 111 or the pulley 112 may be driven, according to which direction the shaft 25 is turned. To accomplish this the bearing member 33 is keyed to the shaft 25 and is provided with a friction clutch face 113. A disk 114 is also keyed to the end of the shaft and is provided with a friction surface 115. The end of the shaft is threaded at 116 with a multiple-pitch thread, a four-pitch being satisfactory, and this thread mates with a thread 117 carried by member 110. This member is cylindrical and carries an outwardly extending flange 118, on each side of which there is a friction washer 119. The operation of this device is as follows: When the shaft 25 turns in a clockwise direction, the clutch member 110, through the threaded connection 116—117, moves to the left in Fig. 2, pinching the pulley 111 between the friction surfaces 115 and 119, thus causing pulley 111 to turn with shaft 25 and permitting pulley 112 to idle on the cylindrical portion of the clutch member 110. When the direction of movement of shaft 25 is reversed, the clutch member will move in an opposite direction, releasing pulley 111 and driving pulley 112.

When this clutch construction is used, pulley 111 may be made to drive pulley 17 through a suitable belt 19 and pulley 18 may be driven through pulley 112, belt 23, pulley 24, pulley 22 and belt 20. Such construction is not necessary a section of film flat in a plane for projection, a fixed mount for one of said plates, a movable mount for the opposite end of said plates, means for moving the movable plate including a rotatable shaft, a hinged bearing for said rotatable shaft in which said shaft may both rotate and rock, a member connected to said movable plate and adapted to be engaged by rocking said shaft for moving said rotatable plate, a spring normally holding said rotatable shaft in engagement with said member, a crank arm carried by said casing, pulleys carried by said crank arm and by said rotatable shaft, a chain loosely connecting said pulleys, whereby movement of said crank may control both the rotative and rocking movement of said shaft, said crank arm being adapted to first take up slack in said chain rocking said shaft against the action of said spring when the crank arm is turned.

6. In a winding and reeling device for projectors, the combination with a casing open at one side, a screen mounted near one end of the casing, a projector carried by the opposite end of said casing, a pair of reel supports adapted to contain reels of film bearing images thereon, and two transparent plates for holding a section of film flat for projection, one plate being mounted to move relative to the other, a pivoted shaft bearing carried by the casing, a shaft rotatably mounted in said pivoted bearing whereby said shaft may both rotate and rock, a member bearing on said shaft and connected to the movable transparent plate for moving the latter through a rocking movement of the former, a pulley on each reel support and on the rockably mounted shaft, belts connecting the pulleys, means for rotating and rocking said rockable shaft comprising a crank and pulley mounted on the casing, a slack belt connecting the crank and pulley and the rotatable shaft, a spring normally holding the rotatable shaft in a fixed position, said shaft being rocked from this position by means of the crank and pulley whereby the relative relation of the reel supports and the transparent plates may be controlled by the crank and pulley.

7. In a winding and reeling device for projectors, the combination with a casing, including a screen to receive an image and a projector for forming an image thereon, said projector including a pair of reel supports adapted to carry reels of film having images thereon, and two transparent plates adapted to hold a section of said film flat, of a shaft rockably and revolubly mounted on the casing, a pulley on each reel support and on said rockably mounted shaft, belts connecting said pulleys, means connecting said rockable shaft and a film holding plate adapted to move the latter from the former, a sprocket on the rockably mounted shaft, a manually operable sprocket mounted on the casing, a chain connecting said sprocket of sufficient length to permit the shaft to rock a limited distance, a handle connected to the sprocket mounted on the casing whereby a single movement of the handle in one direction may first rock the shaft to open the film holding plates and then turn the shaft for moving the film through a film support.

8. In a winding and reeling device for projectors, the combination with a casing, including a screen to receive an image and a projector for forming an image, said projector including a pair of reel supports adapted to contain reels of film having images thereon, and two transparent plates adapted to hold a film flat, of a shaft rockably and revolubly mounted on the casing, a pulley on each reel support and on said rockably mounted shaft, belts connecting said pulleys, clutches connected with the pulleys arranged to drive only one film support at a time while the other film support idles, means connecting said rockable shaft and a film holding plate adapted to move the latter from the former, a sprocket on the rockably mounted shaft, a manually operable sprocket mounted on the casing, a chain connecting said sprocket of sufficient length to permit the shaft to rock a limited distance, the manually operable sprocket being adapted to both rock the shaft and cause the shaft to turn, the manually operable sprocket being movable in either of two directions, so that the rockable shaft may be turned to drive either of the two film supporting shafts.

9. In a winding and reeling device for projectors, the combination with a casing, including a screen to receive an image and a projector for forming an image, said projector including a pair of reel supports adapted to support reels of film containing images thereon and two transparent plates adapted to hold a film flat, of a shaft rockably and revolubly mounted on the casing, a pulley on each reel support and on said rockably mounted shaft, belts connecting said pulleys, means connecting said rockable shaft and a film holding plate adapted to move the latter from the former, a sprocket on the rockably mounted shaft, a manually operable sprocket mounted on the casing, a chain connecting said sprocket of sufficient length to permit the shaft to rock a limited distance, a handle connected to the sprocket carried by the casing adapted to be turned in two directions to transmit motion to said rockable shaft, the first part of the movement, regardless of the direction, being adapted to first rock and then turn the shaft, whereby winding movement of the film is always preceded by the opening of the plates for holding a film flat.

ROY S. HOPKINS.

to use the clutches shown in Fig. 5 for pulleys 17 and 18, although both of these arrangements may be simultaneously used, if desired.

The operation of my machine is as follows: An operator sitting in front of the cabinet 1 may turn the handle 29 until that area of the record which is to be viewed is in focus upon the screen 6. If desired, the handle may be moved to cause the reading matter to change its position on the screen 6, or to move slightly different areas of the film over the objective 40 to bring the desired area into proper focus. If the reading matter is continuously arranged on the film, the operator may, by depressing lever 70 one or more times, move the film by small amounts at a time.

Regardless of whether the operator uses lever 70 or handle 29 for moving the film, each time the film moving means is operated, the slack in chain 28 will be taken up and the shaft 25 will be moved a distance D sufficient to separate the glass plates 38 and 39 a distance sufficient to permit film to pass freely therethrough. Continued movement of the operating handle 29 or 70 will then cause the film to move, the timing being so arranged that the film will never move until the plates 38 and 39 are separated. Thus, there is no tendency to scratch the film and yet the film will be held in a plane by means of the two glass plates. Since the heat screen 45 is also moved in timed relation with the glass plate 38, this screen will be moved each time that the plates are separated.

With this apparatus it is a simple matter to reel off film rapidly from one shaft to another or to move the film slowly and continuously, as when searching for a certain portion of the reading matter, or to move the film in small steps at a time, as when reading line after line of printed matter. It is also a simple matter to properly center the desired portion of the reading matter on the screen 6 by movement of handle 11.

The clutch arrangement makes it possible for the record film to be mounted on two spaced shafts, each of which is positively driven in one direction and idles in the opposite direction so that the tension at all times on the film is as light as possible.

What I claim and desire to secure by Letters Patent of the United States is:

1. In a winding and reeling device for projectors, the combination with an elongated casing, of a screen mounted therein near one end, a projector carried by the opposite end of the casing, a pair of reel supports carried by the projector and adapted to contain film bearing images, said projector being adapted to project an image upon said screen, means for positioning said film for projection comprising two transparent plates for holding said film in a plane, one plate being mounted to move relative to the other plate, a shaft rockably and revolubly mounted on the casing, and means connected to the shaft and to the movable transparent plate for moving the latter from the former, a manually operable member carried by the casing and connected to the rockable shaft for moving the shaft upon its mount, and connections between the arm and shaft for rocking the shaft whereby the movable transparent plate may be spaced from the opposite plate for the passage of film therethrough.

2. In a winding and reeling device for projectors, the combination with a casing, of a screen mounted near one end of the casing, a projector carried by the opposite end of the casing, a pair of reel supports carried by the projector and adapted to carry reels of film bearing images thereon, means for holding a section of film flat for projection comprising two transparent plates, one plate being movably mounted with respect to the other plate, a shaft carried in a hinged bearing, connections between said shaft and said movably mounted plate for moving the latter but moving the shaft in its hinged mount, a manually operable member carried by the casing and connected to the shaft for both rocking and revolving said shaft, pulleys mounted on said shaft and on said casing, a chain loosely connecting said pulleys, said manually operable member being connected with said pulley attached to said casing for rotating said pulley whereby the slack may be taken up in the loose chain to rock said shaft and separate said transparent film holding plates.

3. In a winding and reeling device for projectors, the combination with an elongated casing, of a screen mounted near one end of said casing, a projector mounted near the other end of said casing, said projector including a pair of spaced reel supports adapted to contain reels of film having images thereon, a pair of transparent plates adapted to hold an area of film in a plane for projection, at least one of said plates being movably mounted with respect to the other, a shaft bearing hingedly attached to said casing, a shaft revolubly mounted in said hinged bearing for rocking and rotative movement, connections between said shaft and said movably mounted transparent plate whereby a rocking movement of the said shaft and bearing may move the transparent plate, a pulley on said shaft, a second pulley rotatably mounted on said casing, a manually operable handle connected to said pulley carried by the casing, a chain loosely connecting the two pulleys whereby rotative movement of the pulley mounted on the casing may take up slack in the chain thereby rocking the shaft and moving the movably mounted transparent plate.

4. In a winding and reeling device for projectors, the combination with an elongated casing, of a screen mounted near one end of the casing, a projector carried by the opposite end of the casing, a pair of reel supports carried by the projector and adapted to contain film having images thereon, two transparent plates for holding a film area flat for projection, a movable mount for one transparent plate on which said plate may move to and from the opposite transparent plate, means for moving the movable transparent plate comprising a bearing hingedly attached to the casing and a shaft revolubly mounted in said bearing, means connected to the shaft and movable by rocking the shaft in its hinged bearing for moving the movably mounted film holding plate, a manually operable member carried by the casing and flexibly connected to the shaft for rocking the shaft, said flexible connection comprising an endless member, a pulley carried by the shaft and a pulley carried by the manually operable member for supporting said endless flexible member, whereby said manually operable member may control both the rocking and the rotative movement of said shaft.

5. In a winding and reeling device for projectors, the combination with a casing, of a screen mounted near one end thereof, a projector mounted near the opposite end of the casing and adapted to project an image upon said screen, a pair of reel supports carried by the casing and adapted to contain reels of film bearing images thereon, a pair of transparent plates for holding